Figure 1:
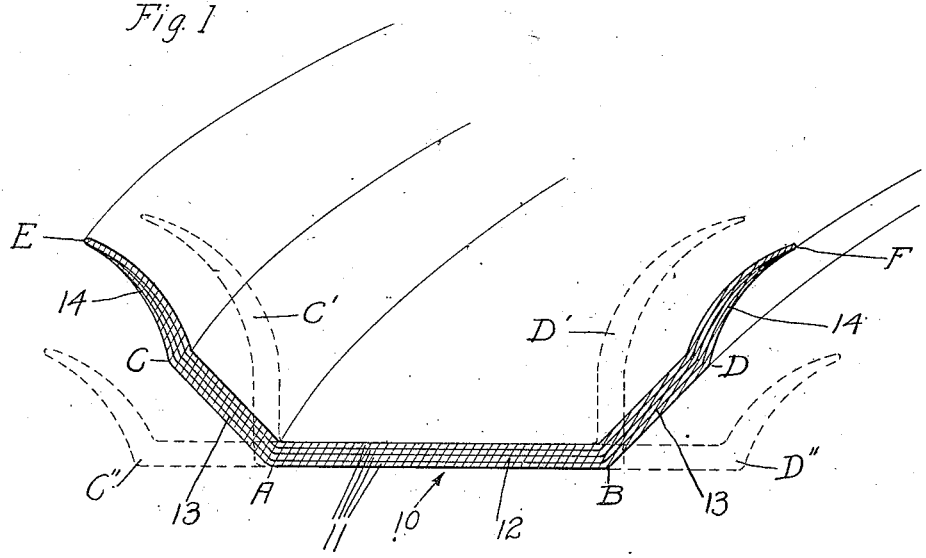

Nov. 20, 1923.

W. E. SHIVELY 1,475,147

PNEUMATIC TIRE FLAP

Filed June 12, 1919

Inventor
Walter E. Shively

By C. F. Landon
Attorney

Patented Nov. 20, 1923.

1,475,147

UNITED STATES PATENT OFFICE.

WALTER E. SHIVELY, OF AKRON, OHIO, ASSIGNOR TO THE GOODYEAR TIRE & RUBBER COMPANY, OF AKRON, OHIO, A CORPORATION OF OHIO.

PNEUMATIC-TIRE FLAP.

Application filed June 9, 1919. Serial No. 302,839.

*To all whom it may concern:*

Be it known that I, WALTER E. SHIVELY, a citizen of the United States, and resident of Akron, Ohio, have invented new and useful Improvements in Pneumatic-Tire Flaps, of which the following is a specification.

The invention relates to a flap adapted to be placed between the inner tube and outer casing of a pneumatic tire.

It has been found that even with tires of the same size the beads applied thereto are not always of uniform width, hence it has been difficult to make a flap which, with the same sized tires, will always fit perfectly.

The object of my invention, therefore, has been to provide a flap, the width of which is adjustable, so that it can be fitted to tires, supposed to be of the same width, yet which vary slightly in manufacture.

Figure 2:
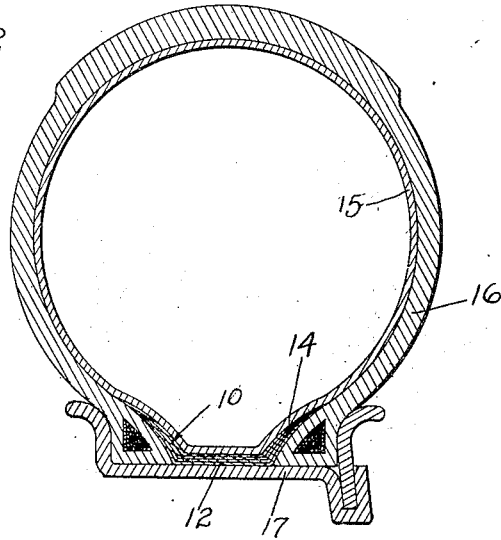

In the drawing wherein I have illustrated a flap made in accordance with my invention:

Figure 1 is a section through the flap, showing the same in different positions of adjustment; and Figure 2 is a cross-section through a tire showing the flap in place.

The flap 10 is made up, as usual in the art, of a plurality of plies 11 of either cross-woven or cord fabric, impregnated with a rubber compound, and it may be endless or have ends which are lapped over and fitted to the valve stem in the usual way.

The flap of my invention is characterized by being molded or otherwise made in the shape shown by the full lines in Fig. 1 of the drawing. In cross-section there is a base portion 12 indicated by the straight line A—B, and turned upwardly from the points A and B at an angle of about 45 degrees to the line A—B are the portions 13 indicated by the lines A—C and B—D. From the points C and D the outward edges are beveled as at 14, to the extreme outward points E and F. Each of the lines A—C and B—D is substantially shorter than the line A—B, or in other words, the portions 13, represented by these lines, are narrower than the base portion 12 represented by line A—B.

In Figure 1 the dotted lines B—D' and B—D" show, for example, the extreme positions of the line B—D, and the lines A—C' and A—C" show the extreme positions of the line A—C. Hence, the line A—B may be adjusted in length from the shortest length A—B to the longest C"—D", that is to say, the width of the base portion may be increased from what it was originally (represented by line A—B) to a width indicated by line C"—D". In other words, the flap may be bent on the circumferential lines passing through the points A and B, so that the flap may readily be fitted between the inner tube and a casing of variable width, and this adjustment, through an angle of 90 degrees may be made without producing any undue strain on the fabric of the flap, or one sufficient to break the strands. Furthermore in bending the edge of the flap in this way, there will be no buckling of the flap, because of the fact that it is impregnated with a rubber compound which gives to it a wide degree of flexibility and compressibility.

In Figure 2, the flap is shown in place between an inner tube 15 and the tire casing 16, and the whole tire mounted on the rim of a wheel 17.

From the above description considered with reference to the drawing, it will be apparent that I have produced a flap molded in such form that its width can be increased up to approximately 75%, and yet conform nicely to the space in which it is fitted.

While I have shown a flap of specific conformation, it will be understood that such changes or modifications as come within the scope of the appended claims may be made, without in any manner departing from the essence of my invention.

What I claim is:

1. A flexible flap, for pneumatic tires, constructed to present in cross section, a base portion having an edge extension comprising normally angularly arranged portions one of which is constructed for hinging movement upon the other.

2. A flexible flap, for pneumatic tires, constructed to present in cross-section, a substantially flat base portion having an edge extension normally projecting at an angle therefrom, and a curvilinear marginal portion for said extension normally disposed at an angle thereto.

3. A flexible flap, for pneumatic tires, constructed to present in cross-section, a substantially flat base portion having a hinged edge portion normally projecting at an angle therefrom, and a marginal extension for said edge portion constructed for hinging movement thereon.

4. A flexible flap, for pneumatic tires, constructed to present in cross-section a substantially flat base portion having a hinged edge portion normally projecting at an angle therefrom, and a curvilinear marginal extension for said edge portion constructed for hinging movement thereon.

5. A flexible flap, for pneumatic tires, constructed to present in cross-section a substantially flat base portion, edge portions of tapered cross-section, and side portions interposed between the base portion and the edge portion and respectively hinged to the base portion and to the edge portion.

6. A flexible flap, for pneumatic tires, having a base portion and tapered edge portions, each edge portion having a plurality of defined hinge portions by means of which the flap may be adapted to tires of different widths.

In witness whereof, I have hereunto signed my name in the presence of two subscribing witnesses.

WALTER E. SHIVELY.

Witnesses:
E. C. LEADENHAM,
C. A. STRAW, Jr.